United States Patent
Sun

(10) Patent No.: US 7,433,135 B2
(45) Date of Patent: *Oct. 7, 2008

(54) IMAGE PICK-UP LENS SYSTEM

(75) Inventor: Wen-Hsin Sun, Tu-Cheng (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

This patent is subject to a terminal disclaimer.

(21) Appl. No.: 11/454,490

(22) Filed: Jun. 16, 2006

(65) Prior Publication Data

US 2007/0070234 A1  Mar. 29, 2007

(30) Foreign Application Priority Data

Sep. 28, 2005  (CN) .................. 2005 1 0100039

(51) Int. Cl.
*G02B 9/34* (2006.01)
(52) U.S. Cl. .................. 359/773; 359/715; 359/569
(58) Field of Classification Search ............ 359/715, 359/773, 569
See application file for complete search history.

(56) References Cited

U.S. PATENT DOCUMENTS

| 3,944,337 | A | | 3/1976 | Ruben |
| 5,327,290 | A | * | 7/1994 | Fukushima et al. ......... 359/692 |
| 5,581,405 | A | * | 12/1996 | Meyers et al. .............. 359/571 |
| 6,282,033 | B1 | | 8/2001 | Ning |
| 2005/0105194 | A1 | | 5/2005 | Matsui et al. |
| 2006/0291061 | A1 | * | 12/2006 | Iyama et al. ............... 359/614 |

FOREIGN PATENT DOCUMENTS

CN  2577302 Y  10/2003

* cited by examiner

*Primary Examiner*—Joshua L Pritchett

(57) ABSTRACT

A image pick-up lens system includes: a first lens with positive diffractive power, a second lens with negative diffractive power, a third lens with positive diffractive power, and a fourth lens with negative diffractive power. The first lens, the second lens, the third lens and the fourth lens are aligned in that order from an object side to an image side, and each of the four lenses is an aspheric lens made from a plastic material.

6 Claims, 3 Drawing Sheets

IMAGE PICK-UP LENS SYSTEM

CROSS-REFERENCE

This application relates to a co-filed, co-assigned application Ser. No. 11/454,544 entitled, "Hybrid Lens System" hereby incorporated by reference thereto.

TECHNICAL FIELD

The present invention relates to an image pick-up lens system which projects an image of an object onto an image pick-up surface, the image pick-up lens system being suitable for use in products such as camera modules.

BACKGROUND

In recent years, camera modules for taking photos have begun to be incorporated in mobile terminals such as mobile phones and lap-top computers. Downsizing the camera modules is a prerequisite for enhancing the portability of these apparatuses. The camera module operates with an image pickup device such as a CCD (Charged Coupled Device) or a CMOS (Complementary Metal Oxide Semiconductor). Recently, a pixel having the size of approximately a few micrometers has become commercially feasible, and an image pickup device with high resolution and a compact size can now be mass manufactured and marketed. This is accelerating the demand for downsizing of image pick-up lens systems so that they are able to be suitably used with miniaturized image pickup devices. It is also increasing expectations of cost reductions in image pick-up lens systems, commensurate with the lower costs enjoyed by modern image pickup devices. All in all, an image pick-up lens system needs to satisfy the oft-conflicting requirements of compactness, low cost, lightweight, and excellent optical performance.

A typical image pick-up lens system of a camera includes, from an object side to an image side, a biconvex first lens, a biconcave second lens, a meniscus-shaped third lens, and a biconvex fourth lens. All of the four lenses are spherical lenses made from glass materials. Therefore, all the lenses can be produced readily. However, the lenses are made from glass materials, which runs counter to the requirement of lightweight. In addition, shock resistances of glass materials are relatively low. If the camera falls off, the lenses in the lens system are liable to be damaged. Furthermore, the employment of spherical lenses always leads to spherical aberration, which goes against the requirement of excellent optical performance.

What is needed, therefore, a image pick-up lens system which has high shock resistance and lightweight is desired.

SUMMARY

In a preferred embodiment, a image pick-up lens system includes: a first lens with positive diffractive power, a second lens with negative diffractive power, a third lens with positive diffractive power, and a fourth lens with negative diffractive power. The first lens, the second lens, the third lens and the fourth lens are aligned in that order from an object side to an image side. Each of the four lenses is an aspheric lens made from a plastic material.

Other advantages and novel features will become more apparent from the following detailed description when taken in conjunction with the accompanying drawings, in which:

BRIEF DESCRIPTION OF THE DRAWINGS

Many aspects of the present image pick-up lens system can be better understood with reference to the following drawings. The components in the drawings are not necessarily to scale, the emphasis instead being placed upon clearly illustrating the principles of the present image pick-up lens system. Moreover, in the drawings, like reference numerals designate corresponding parts throughout the several views.

The exemplifications set out herein illustrate at least one preferred embodiment of the invention, in one form, and such exemplifications are not to be construed as limiting the scope of the invention in any manner.

DETAILED DESCRIPTION OF PREFERRED EMBODIMENTS

Embodiments of the present invention will now be described in detail below and with reference to the drawings.

Figure 1:
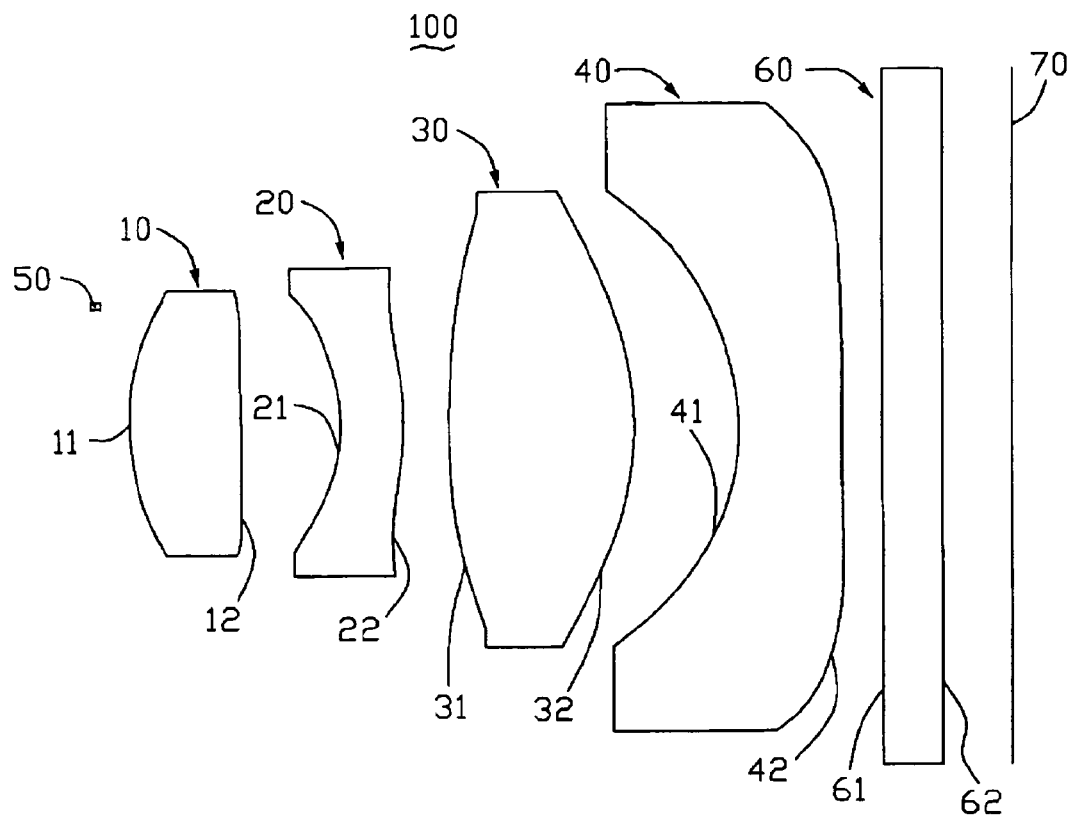
FIG. 1 is a schematic, cross-sectional view of a image pick-up lens system in accordance with a preferred embodiment, and also showing a cover glass and an image pick-up surface.

Referring to FIG. 1, a image pick-up lens system 100 according to a preferred embodiment is provided. The image pick-up lens system 100 includes a positive first lens 10, a negative second lens 20, a positive third lens 30, a negative fourth lens 40, an aperture stop 50, and a cover glass 60. An image pickup device 70 is also provided The aperture stop 50, the positive first lens 10, the negative second lens 20, the positive third lens 30, the negative fourth lens 40, the cover glass 60, and the image pickup device 70 are aligned in that order from an object side to an image side.

The first lens 10 is a biconvex lens with a convex first surface 11 and a convex second surface 12. The first surface 11 or the second surface 12 may further include an infrared-cut film formed thereon. The first lens 10 is made from an optical plastic, which has a refractive index $n_1=1.53116$ at d-line (light of wavelength 587.6 nm), and an Abbe number $v_1=56.4$ at d-line. The second lens 20 is a meniscus-shaped lens with a concave third surface 21 facing the object side and a convex fourth surface 22. The second lens 20 is made from an optical plastic, which has a refractive index $n_2=1.60726$ at d-line, and an Abbe number $v_2=26.645$ at d-line. The positive third lens 30 is a biconvex lens with a convex fifth surface 31 and a convex sixth surface 32. The fourth lens 40 is a biconcave lens with a concave seventh surface 41 and a concave eighth surface 42. The third lens 30 and the fourth lens 40 are made from the same optical plastic of the first lens 10. Each of the four lenses 10, 20, 30 and 40 is aspheric on both surfaces thereof. The cover glass 60 is plate-shaped and includes a planar ninth surface 61 and a planar tenth surface 62. The cover glass 6 is made of a transparent glass material. The planar ninth surface 61 or the planar tenth surface 62 may further include an infrared-cut film formed thereon. The first surface 11, the second surface 12, the third surface 21, the fourth surface 22, the fifth surface 31, the sixth surface 32, seventh surface 41, the eighth surface 42, the ninth surface 61 and the tenth surface 62 are aligned in that order from the object side to the image side.

The image pickup device 70 may employ a CCD (Charged Coupled Device) sensor or a CMOS (Complementary Metal Oxide Semiconductor) sensor. In the preferred embodiment, a four-megapixel CMOS sensor is employed as the image pickup device 70 according to the low cost requirement. A half length of a diagonal line of the CMOS sensor is 3.65 millimeters (mm). That means the max image height on the CMOS is 3.65 mm.

The following are symbols used in the exemplary embodiment.

r: radius of curvature
d: distance between surfaces on the optical axis of the system
Φ: diameter
k: conic constant In the preferred embodiment, the image pick-up lens system 100 satisfy the data in Table 1 and Table 2.

TABLE 1

| Surface | r (mm) | d (mm) | Φ (mm) | k | lens material (type) |
|---|---|---|---|---|---|
| stop 50 | ∞ | 0.03793641 | 2.196429 | 0 | |
| 1st | 2.507463 | 1.035432 | 2.663337 | 0 | Plastic (E48R) |
| 2nd | −30.64801 | 0.8919749 | 2.842027 | 0 | |
| 3rd | −1.707669 | 0.6706504 | 2.761362 | 0 | Plastic (OKP4) |
| 4th | −3.730452 | 0.2888542 | 3.307150 | 0 | |
| 5th | 7.019624 | 1.930534 | 4.592272 | 0 | Plastic (E48R) |
| 6th | −2.946644 | 0.7619424 | 4.712964 | 0 | |
| 7th | −2.423477 | 0.9876256 | 4.712964 | 0 | Plastic (E48R) |
| 8th | 11.67742 | 0.2 | 6.758258 | 0 | |
| 9th | ∞ | 0.55 | 7.275678 | 0 | Glass (B270) |
| 10th | ∞ | 0.3999999 | 7.434424 | 0 | |
| Total length | | 7.75494981 mm | | | | wherein, each surface of the four lenses is an aspheric surface, the shape of each aspheric surface is provided by a expression as follow:

$$x = \frac{cr^2}{1 + \sqrt{1 - (k+1)c^2 r^2}} + \sum A_{2i} r^{2i}$$

wherein, x is a depth from the surface to a tangent plane of a vertex of the surface, r is a height from the optical axis of the system to the surface, c is a vertex curvature, k is a conic constant, and $A_{2i}$ are 2i-th order correction coefficients of the aspheric surface.

TABLE 2

| Surface | $A_4$ | $A_6$ | $A_8$ | $A_{10}$ |
|---|---|---|---|---|
| 1st | −0.0025447593 | −0.0038340354 | 0.0021331884 | −0.0017471638 |
| 2nd | −0.012018615 | −0.004274024 | −0.0022547062 | −0.00047502827 |
| 3rd | 0.050574577 | 0.0085296415 | −0.015284556 | 0.0051498459 |
| 4th | 0.03818522 | 0.0064238587 | −0.005086404 | 0.0011148455 |
| 5th | −0.0052855276 | 0.0021742108 | −0.00057824202 | $7.2737522 \times 10^{-5}$ |
| 6th | 0.0037028643 | 0.00043607449 | 0.00012031339 | $5.6266318 \times 10^{-6}$ |
| 7th | −0.0020877187 | 0.00070889843 | 0.00027089014 | $-3.3752333 \times 10^{-6}$ |
| 8th | −0.013269745 | 0.0003080615 | $4.8344042 \times 10^{-5}$ | $-5.21778 \times 10^{-6}$ |

Referring to FIG. 1 and Table 1, the size of the image pick-up lens system 100 is relatively small, the total length is only 7.75494981 mm, approximately 7.76 mm. In operation, light beams from an object side of the image pick-up lens system 100 sequentially pass through the aperture stop 50, the first lens 10, the second lens 20, the third lens 30, the fourth lens 40, and the cover glass 60, and then converged onto the image pickup device 70.

Figure 2:
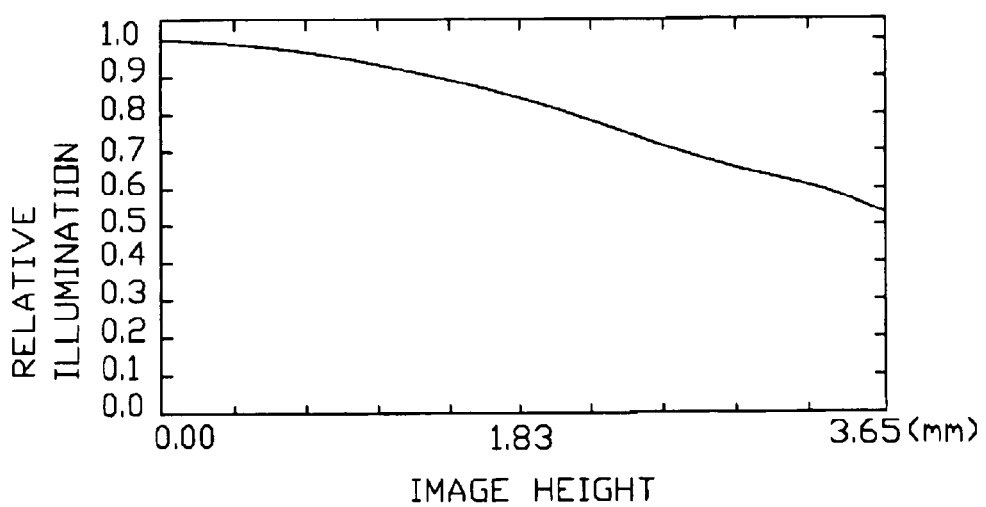
FIG. 2 is a graph illustrating a relationship between relative illumination and image height of the image pick-up lens system of FIG. 1.
Figure 3:
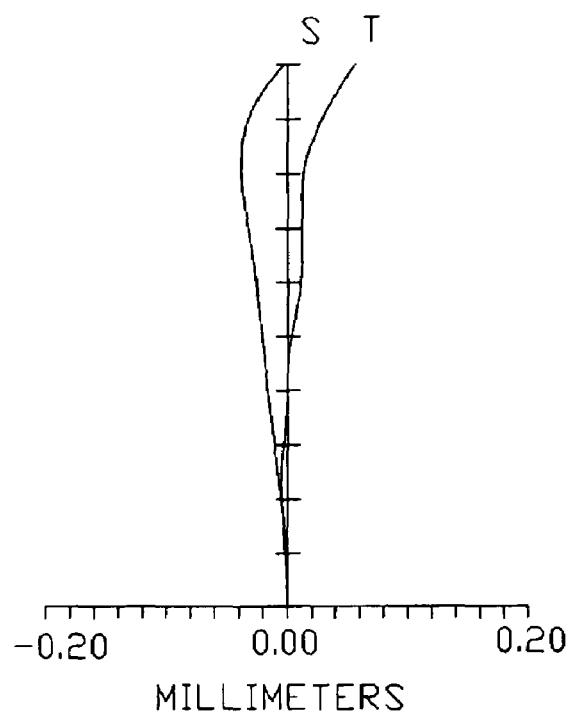
FIGS. 3-4 are graphs showing the field curvature and distortion for the image pick-up lens system of FIG. 1.
Figure 4:
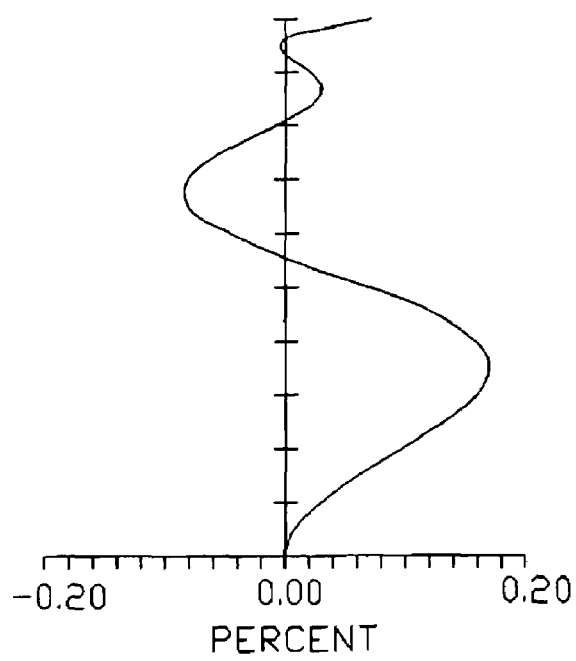
Figure 5:
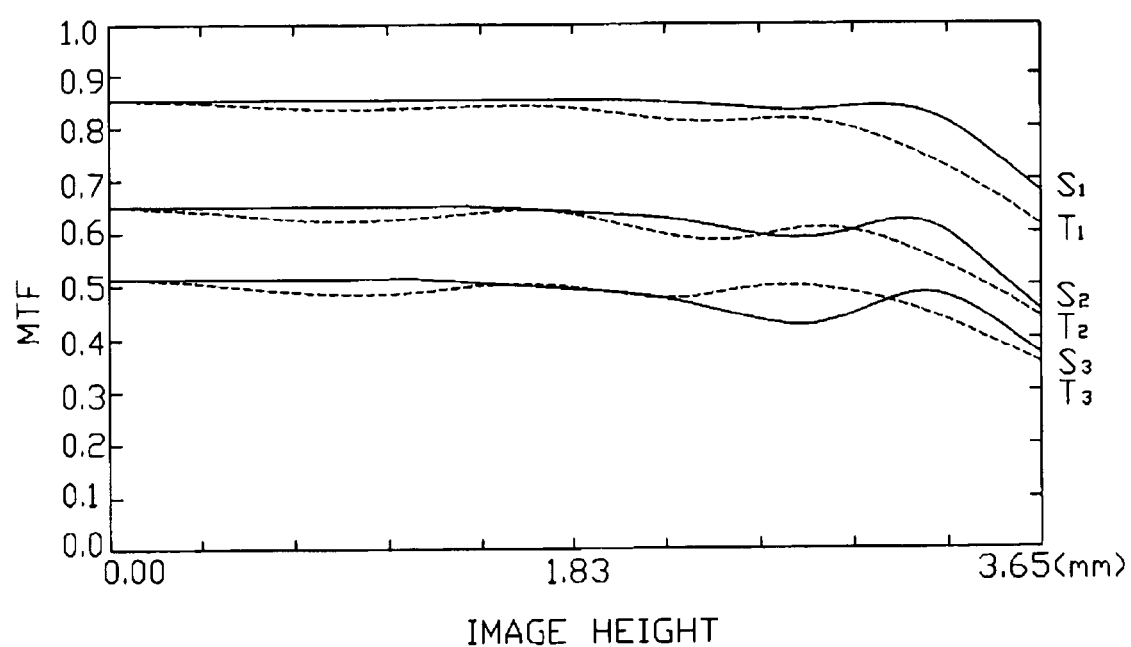
FIG. 5 is a graph showing MTF (modular transfer function) curves of the image pick-up lens system of FIG. 1.

FIG. 2 is a graph illustrates a relationship between relative illumination and image height of the image pick-up lens system 100 of the preferred embodiment. FIGS. 3-4 are graphs respectively show the field curvature and distortion for the image pick-up lens system 100 of the preferred embodiment. FIG. 5 is a graph illustrates MTF curves for the three line frequencies of 45 lp/mm (line pairs/mm), 90 lp/mm and 120 lp/mm, from the center (0.00 mm) to the edge (3.65 mm) of the image of the image pick-up lens system 100 of the preferred embodiment. The solid lines $S_1$, $S_2$ and $S_3$ are the radial MTF curves for the three line frequences of 45 lp/mm, 90 lp/mm and 120 lp/mm of the image of the image pick-up lens system 100 respectively, and the broken lines $T_1$, $T_2$ and $T_3$ are the tangential MTF curves for the three line frequences of 45 lp/mm, 90 lp/mm and 120 lp/mm of the image of the image pick-up lens system 100 respectively.

As stated above, in the image pick-up lens system in accordance with the preferred embodiment, all the lenses are made from plastic materials, which satisfies the low cost and light-weight requirements, and the shock resistance thereof is relatively high. In addition, all the four lens of the image pick-up lens system are aspheric lenses, therefore the image pick-up lens system can appropriately correct fundamental aberrations, and excellent optical performance can be achieved.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. An image pick-up lens system comprising:
    a first lens with positive refractive power comprising a convex first surface and a convex second surface;
    a second lens with negative refractive power comprising a concave third surface and a convex fourth surface;
    a third lens with positive refractive power comprising a convex fifth surface and a convex sixth surface; and
    a fourth lens with negative refractive power comprising a concave seventh surface and a concave eighth surface;
    wherein the first lens, the second lens, the third lens and the fourth lens are aligned in that order from an object side to an image side, and each of the four lenses is an aspheric lens made from a plastic material, the first surface, the second surface, the third surface, the fourth surface, the fifth surface, the sixth surface, the seventh surface and the eighth surface are aligned in that order from the object side to the image side, and each of the surfaces is aspheric.

2. The image pick-up lens system of claim 1, wherein at least one of the surfaces of the first lens comprises an infrared-cut film formed thereon.

3. The image pick-up lens system of claim 1, further comprising an aperture stop positioned between the first lens and the object side, and a cover glass positioned between the fourth lens and the image side.

4. The image pick-up lens system of claim 3, wherein the dover glass has a planar ninth surface and a planar tenth surface being aligned in that order from the object side to the image side.

5. The image pick-up lens system of claim 4, wherein the data of the image pick-up lens system satisfies the following:

| Surface | R (mm) | d (mm) | Φ (mm) | k | material (type) |
|---|---|---|---|---|---|
| Aperture stop | ∞ | 0.03793641 | 2.196429 | 0 | — |
| 1st | 2.507463 | 1.035432 | 2.663337 | 0 | Plastic (E48R) |
| 2nd | −30.64801 | 0.8919749 | 2.842027 | 0 | |
| 3rd | −1.707669 | 0.6706504 | 2.761362 | 0 | Plastic (OKP4) |
| 4th | −3.730452 | 0.2888542 | 3.307150 | 0 | |
| 5th | 7.019624 | 1.930534 | 4.592272 | 0 | Plastic (E48R) |
| 6th | −2.946644 | 0.7619424 | 4.712964 | 0 | |
| 7th | −2.423477 | 0.9876256 | 4.712964 | 0 | Plastic (E48R) |

-continued

| Surface | R (mm) | d (mm) | Φ (mm) | k | material (type) |
|---|---|---|---|---|---|
| 8th | 11.67742 | 0.2 | 6.758258 | 0 | |
| 9th | ∞ | 0.55 | 7.275678 | 0 | Glass (B270) |
| 10th | ∞ | 0.3999999 | 7.434424 | 0 | | wherein, r is a radius of curvature, d is a distance between surfaces on the optical axis of the system, Φ is a diameter, and k is a conic constant.

6. The image pick-up lens system of claim 1, wherein the correction coefficients of the aspheric surfaces satisfy the following:

| Surface | $A_4$ | $A_6$ | $A_8$ | $A_{10}$ |
|---|---|---|---|---|
| 1st | −0.0025447593 | −0.0038340354 | 0.0021331884 | −0.0017471638 |
| 2nd | −0.012018615 | −0.004274024 | −0.0022547062 | −0.00047502827 |
| 3rd | 0.050574577 | 0.0085296415 | −0.015284556 | 0.0051498459 |
| 4th | 0.03818522 | 0.0064238587 | −0.005086404 | 0.0011148455 |
| 5th | −0.0052855276 | 0.0021742108 | −0.00057824202 | $7.2737522 \times 10^{-5}$ |
| 6th | 0.0037028643 | 0.00043607449 | 0.00012031339 | $5.6266318 \times 10^{-6}$ |
| 7th | −0.0020877187 | 0.00070889843 | 0.00027089014 | $-3.3752333 \times 10^{-6}$ |
| 8th | −0.013269745 | 0.0003080615 | $4.8344042 \times 10^{-5}$ | $-5.21778 \times 10^{-6}$. |

\* \* \* \* \*